(12) United States Patent
Jeong et al.

(10) Patent No.: US 7,007,490 B2
(45) Date of Patent: Mar. 7, 2006

(54) REFRIGERATOR AND CONTROL METHOD THEREOF

(75) Inventors: Seong Wook Jeong, Gwangju (KR); Jung Yeob Kim, Gwangju (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 10/814,795

(22) Filed: Apr. 1, 2004

(65) Prior Publication Data

US 2005/0217287 A1  Oct. 6, 2005

(30) Foreign Application Priority Data

Mar. 30, 2004 (KR) .................... 10-2004-0021495

(51) Int. Cl.
*F25D 17/06* (2006.01)
(52) U.S. Cl. .............................. 62/179; 62/180; 62/182
(58) Field of Classification Search .................. 62/157, 62/158, 231, 182, 179, 180, 199, 200
See application file for complete search history.

(56) References Cited

U.S. PATENT DOCUMENTS

| 5,899,083 A | 5/1999 | Peterson et al. | |
|---|---|---|---|
| 5,931,004 A * | 8/1999 | Yoo et al. ...................... | 62/82 |
| 6,000,232 A * | 12/1999 | Witten-Hannah et al. ...... | 62/89 |
| 6,182,455 B1 * | 2/2001 | Kikuyama ................... | 62/181 |
| 6,598,410 B1 * | 7/2003 | Temmyo et al. .............. | 62/179 |

* cited by examiner

*Primary Examiner*—Harry B. Tanner
(74) *Attorney, Agent, or Firm*—Staas & Halsey LLP (57) ABSTRACT

A refrigerator, in which air blast fans in storage chambers are controlled so as to reduce a power consumption rate, and a control method of the refrigerator. The control method includes the steps of (a) determining whether or not a plurality of air blast devices, respectively connected to a plurality of storage chambers, and a compressor are respectively in starting conditions; (b) in case that it is determined that at least two air blast devices and the compressor are in the starting conditions, turning a part of the at least two air blast devices in the starting condition and the compressor on; and (c) turning all of the air blast devices in the starting condition on after a designated time from the turning-on of the air blast device elapses.

13 Claims, 5 Drawing Sheets

REFRIGERATOR AND CONTROL METHOD THEREOF

CROSS-REFERENCE TO RELATED APPLICATION

This application claims the benefit of Korean Patent Application No. 2004-21495, filed Mar. 30, 2004, in the Korean Intellectual Property Office, the disclosure of which is incorporated herein by reference.

BACKGROUND OF THE INVENTION

1. Field of the Invention

The present invention relates to a refrigerator and a control method thereof, and, more particularly, to a refrigerator, in which air blast fans in storage chambers are controlled so as to reduce a power consumption rate, and a control method of the refrigerator.

2. Description of the Related Art

Generally, a refrigerator comprises refrigerating and freezing chambers for respectively storing foods in cold and frozen states, refrigerating and freezing chamber heat exchangers for cooling air in the refrigerating and freezing chambers by heat-exchanging, refrigerating and freezing chamber fans installed adjacent to the refrigerating and freezing chamber heat exchangers for circulating cooled air into the refrigerating and freezing chambers, and a compressor for compressing a refrigerant to supply the refrigerant to the refrigerating and freezing chamber heat exchangers.

In case that a temperature in the refrigerating or freezing chamber of the above refrigerator is higher than a predetermined temperature, the refrigerating or freezing chamber fans together with the compressor is turned on so as to reduce the temperature in the refrigerating or freezing chamber.

Figure 1:
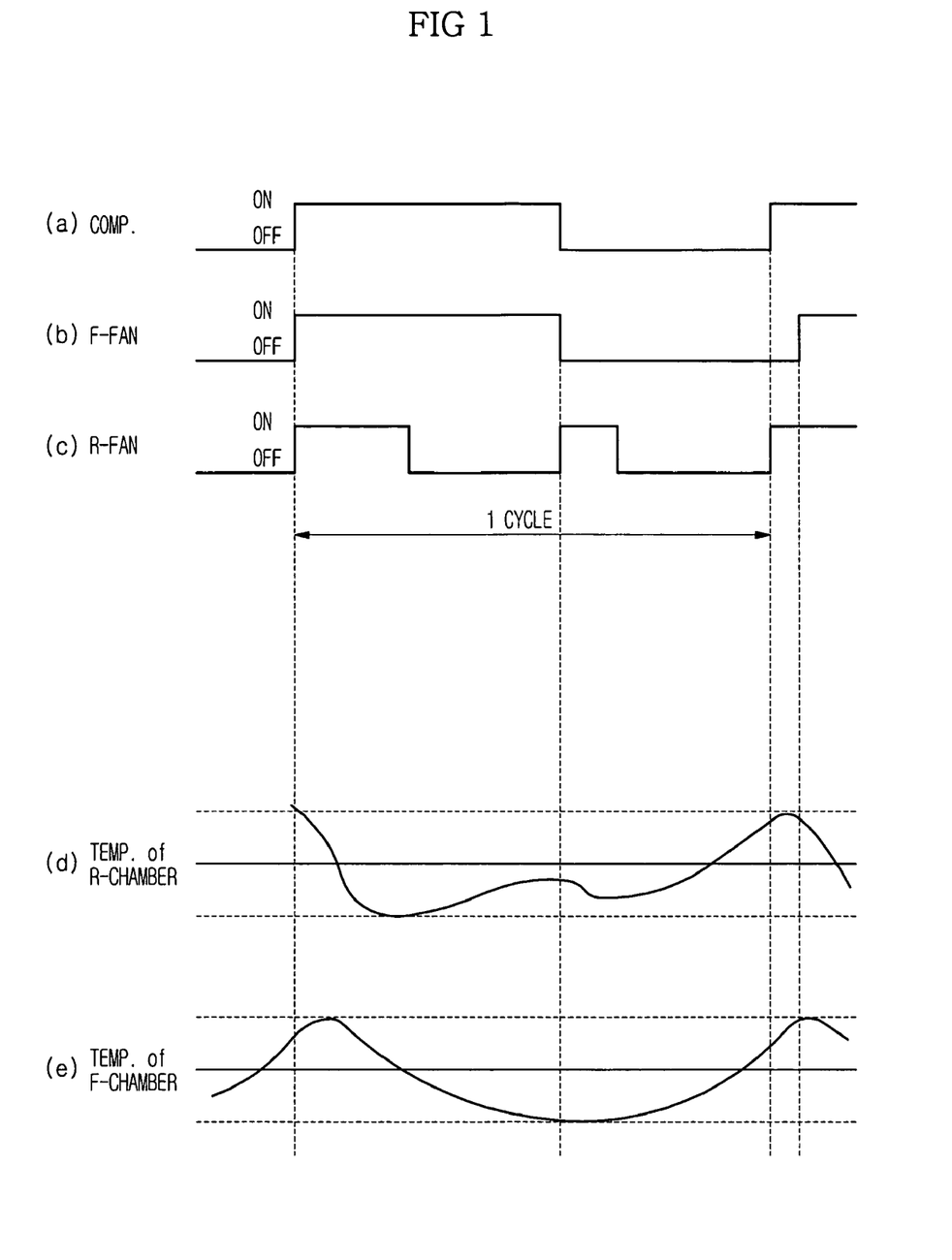
FIGS. 1A to 1E are graphs illustrating variations in temperature of refrigerating and freezing chambers of a conventional refrigerator in relation to operations of refrigerating and freezing chamber fans.

FIGS. 1A to 1E are graphs illustrating variations in temperature of refrigerating and freezing chambers of a conventional refrigerator in relation to operations of refrigerating and freezing chamber fans. More specifically, FIG. 1A is a graph illustrating the on-off operation of the compressor, FIG. 1B is a graph illustrating the on-off operation of the freezing chamber fan, FIG. 1C is a graph illustrating the on-off operation of the refrigerating chamber fan, FIG. 1D is a graph illustrating variation in the temperature of the refrigerating chamber in relation to the operations of the compressor and the refrigerating chamber fan, and FIG. 1E is a graph illustrating variation in the temperature of the freezing chamber in relation to the operations of the compressor and the freezing chamber fan. As shown in FIGS. 1A to 1E, although the compressor, the refrigerating chamber fan and the freezing chamber fan of the conventional refrigerator are simultaneously turned on, the temperature of the refrigerating chamber increases for a designated time and then decreases.

However, since the freezing chamber fan of the conventional refrigerator is continuously turned on even when the temperature of the freezing chamber does not decrease for a designated time from the starting of the compressor, the freezing chamber is not efficiently cooled in proportion to supplied electricity.

The above problem may be generated when an external temperature exceeds the load of the compressor and the temperatures of the refrigerating and freezing chambers cannot be simultaneously decreased even by the maximum operating capacity of the compressor.

Further, the above problem may be generated in a cooling system, in which the refrigerating chamber heat exchanger and the freezing chamber heat exchanger are connected in series and a refrigerant compressed by the compressor passes through a condenser and then passes through the refrigerating chamber heat exchanger and the freezing chamber heat exchanger sequentially.

SUMMARY OF THE INVENTION

Therefore, an aspect of the invention is to provide a refrigerator, in which air blast fans in storage chambers are controlled so as to reduce a power consumption rate, and a control method of the refrigerator.

In accordance with one aspect, the present invention provides a control method of a refrigerator comprising the steps of: (a) determining whether or not a plurality of air blast devices, respectively connected to a plurality of storage chambers, and a compressor are respectively in starting conditions; (b) in case that it is determined that at least two air blast devices and the compressor are in the starting conditions, turning a part of the at least two air blast devices in the starting condition and the compressor on; and (c) turning all of the air blast devices in the starting condition on after a designated time from the turning-on of the air blast device elapses.

The compressor may be in the starting condition, in case that at least one of the storage chambers has a temperature higher than a corresponding reference temperature.

The air blast devices may be in the starting condition, in case that the storage chambers connected to the air blast devices have temperatures higher than corresponding reference temperatures.

The part of the at least two air blast devices in the starting condition and the compressor may be sequentially turned on.

Alternately, the part of the at least two air blast devices in the starting condition and the compressor may be simultaneously turned on.

In accordance with another aspect, the present invention provides a control method of a refrigerator comprising the steps of: (a) determining whether or not a compressor and a refrigerating chamber air blast device are respectively in starting conditions; (b) in case that it is determined that the compressor and the refrigerating chamber air blast device are respectively in the starting conditions, turning the compressor and the refrigerating chamber air blast device on; (c) determining whether or not a freezing chamber air blast device is in a starting condition; and (d) in case that it is determined that the freezing chamber air blast device is in the starting condition, turning the freezing chamber air blast device on after a designated time from the turning-on of the refrigerating chamber air blast device elapses.

The compressor may be in the starting condition, in case that the refrigerating chamber has a temperature higher than a first reference temperature or the freezing chamber has a temperature higher than a second reference temperature.

The refrigerating chamber air blast device may be in the starting condition, in case that the refrigerating chamber has a temperature higher than a first reference temperature.

The freezing chamber air blast device may be in the starting condition, in case that the freezing chamber has a temperature higher than a second reference temperature.

The refrigerating chamber air blast device and the compressor may be sequentially turned on.

Alternately, the refrigerating chamber air blast device and the compressor may be simultaneously turned on.

An external temperature of external air around the refrigerator may be measured in case that the freezing chamber air blast device is in the starting condition; it may be determined whether or not the measured external temperature is higher than a third reference temperature; and the freezing chamber air blast device may be turned on after the designated time elapses in case that it is determined that the measured external temperature is higher than the third reference temperature, or the freezing chamber air blast device may be immediately turned on in case that it is determined that the measured external temperature is lower than the third reference temperature.

In accordance with still another aspect, the present invention provides a refrigerator comprising: a plurality of storage chambers prepared in a main body; a plurality of heat exchangers connected to the corresponding storage chambers for heat-exchanging air in the storage chambers; a plurality of air blast devices for circulating the air in the storage chambers; a compressor for compressing a refrigerant to supply the refrigerant to the heat exchangers; and a controller for, in case that it is determined that at least two air blast devices and the compressor are in the starting conditions, turning a part of the at least two air blast devices in the starting condition and the compressor on, and for turning all of the air blast devices in the starting condition on after a designated time from the turning-on of the air blast device elapses.

In accordance with yet another aspect, the present invention provides a refrigerator comprising: freezing and refrigerating chambers prepared in a main body; freezing and refrigerating chamber heat exchangers respectively connected to the freezing and refrigerating chambers for heat-exchanging air in the freezing and refrigerating chambers; freezing and refrigerating air blast devices for circulating the air in the freezing and refrigerating chambers; a compressor for compressing a refrigerant to supply the refrigerant to the freezing and refrigerating air blast devices; and a controller for turning the compressor and the refrigerating chamber air blast device on, in case that it is determined that the compressor is in the starting condition and the freezing and refrigerating air blast devices are in starting conditions, and for turning the freezing chamber air blast device on after a designated time from the turning-on of the compressor and the refrigerating chamber air blast device elapses.

BRIEF DESCRIPTION OF THE DRAWINGS

The above objects, and other features and advantages of the present invention will become more apparent after reading the following detailed description when taken in conjunction with the drawings, in which.

DETAILED DESCRIPTION OF THE PREFERRED EMBODIMENTS

Now, a preferred embodiment of the present invention will be described in detail with reference to the annexed drawings.

Figure 2:
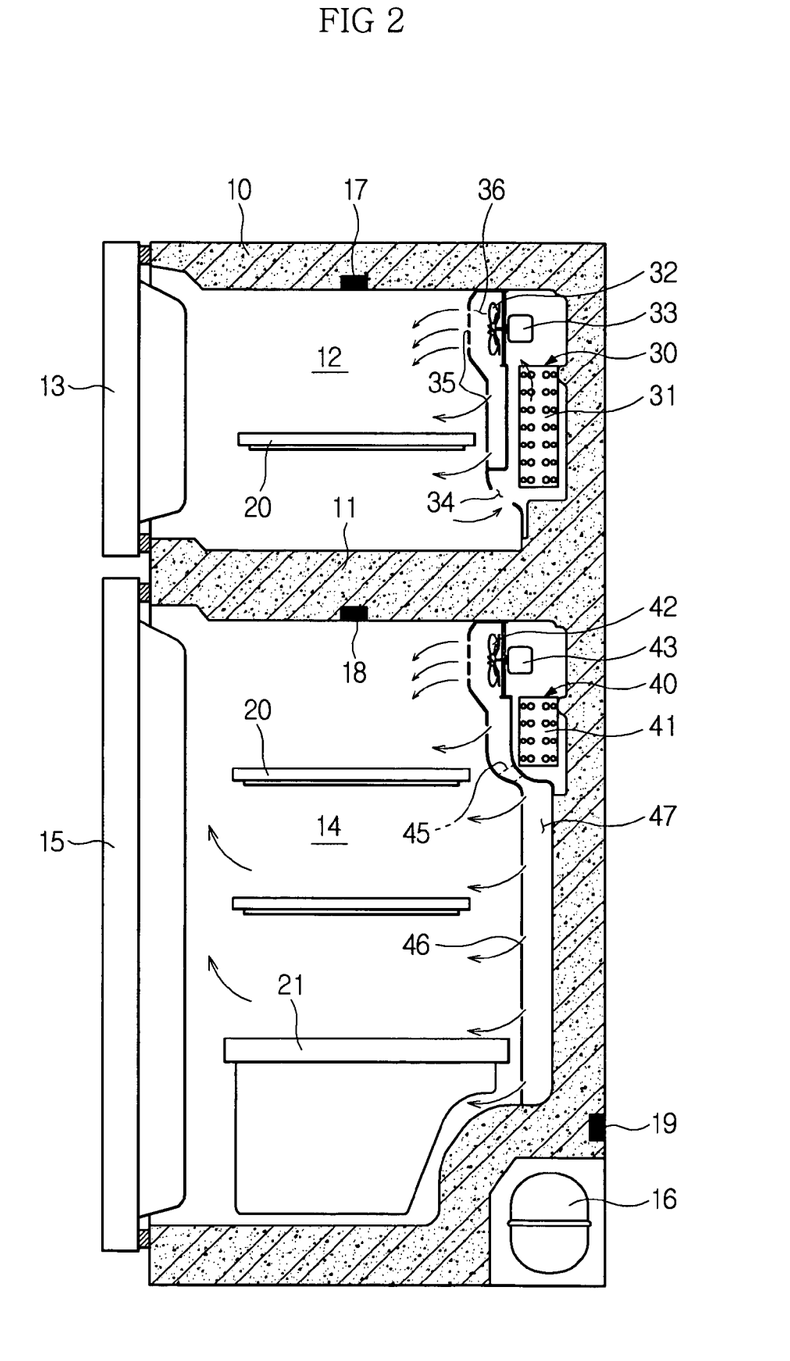
FIG. 2 is a longitudinal-sectional view of a refrigerator in accordance with an embodiment of the present invention.

As shown in FIG. 2, a refrigerator in accordance with an embodiment of the present invention comprises a main body 10, a freezing chamber 12 provided with an opened front surface and positioned at an upper part of the main body 10 divided by an intermediate partition 11, a freezing chamber door 13 for opening and closing the opened front surface of the freezing chamber 12, a refrigerating chamber 14 provided with an opened front surface and positioned at a lower part of the main body 10 divided by the intermediate partition 11, a refrigerating chamber door 15 for opening and closing the opened front surface of the refrigerating chamber 14, and a compressor 16 installed at a lower portion of a rear surface of the main body 10.

Freezing and refrigerating chamber heat exchanging units 30 and 40 for achieving the heat-exchange are respectively installed between rear surfaces of the freezing and refrigerating chambers 12 and 14 and the main body 10, freezing and refrigerating chamber temperature sensors 17 and 18 are respectively installed at designated areas of walls of the freezing and refrigerating chambers 12 and 14, and an external temperature sensor 19 for sensing the external temperature is installed at a designated area of the rear surface of the main body 10. Racks 20 and storage boxes 21 for storing foods are positioned in the freezing and refrigerating chambers 12 and 14.

The freezing chamber heat exchanging unit 30 includes a freezing chamber heat exchanger 31 for cooling air in the freezing chamber 12 by means of heat-exchanging, a freezing chamber fan 32 installed above the freezing chamber heat exchanger 31 for circulating the cooled air having passed through the freezing chamber heat exchanger 31 into the freezing chamber 12, and a freezing chamber fan motor 33 for operating the freezing chamber fan 32. An inlet 34 for allowing air in the freezing chamber 12 to be drawn into the freezing chamber heat exchanger 31 therethrough by the operation of the freezing chamber fan 32 is formed through the rear surface of the freezing chamber 12 below the freezing chamber heat exchanger 31. A plurality of outlets 35 for uniformly discharging cooled air blown by the freezing chamber fan 32 into the freezing chamber 12 are formed through the rear surface of the freezing chamber 12, and a discharge path 36 for guiding the cooled air blown by the freezing chamber fan 32 to the outlets 35 is formed between the freezing chamber heat exchanger 31 and the rear surface of the freezing chamber 12. Therefore, in case that the freezing chamber fan 32 is operated, the air in the freezing chamber 12 is drawn through the inlet 34, rises, and passes through the freezing chamber heat exchanger 31. Then, the air, which is cooled by the heat-exchange action of the freezing chamber heat exchanger 31, is guided by the discharge path 36 and is then uniformly discharged into the freezing chamber 12 through the outlets 35.

The refrigerating chamber heat exchanging unit 40 has a similar structure to that of the freezing chamber heat exchanging unit 30. The refrigerating chamber heat exchanging unit 40 includes a refrigerating chamber heat exchanger 41 for cooling air in the refrigerating chamber 14 by means of heat-exchanging, a refrigerating chamber fan 42 installed above the refrigerating chamber heat exchanger 41 for circulating the cooled air having passed through the refrigerating chamber heat exchanger 41 into the refrigerating chamber 14, and a refrigerating chamber fan motor 43 for operating the refrigerating chamber fan 42. An inlet (not shown), for allowing air in the refrigerating chamber 14 to be drawn into the refrigerating chamber heat exchanger 41 therethrough by the operation of the refrigerating chamber fan 42, and an intake path 45, for guiding the air drawn by the inlet to the refrigerating chamber heat exchanger 41, are formed below the refrigerating chamber heat exchanger 41. A plurality of outlets 46 for uniformly discharging cooled air blown by the refrigerating chamber fan 42 into the refrigerating chamber 14 are formed through the rear surface of the refrigerating chamber 14, and a discharge path 47 for guiding the cooled air blown by the refrigerating chamber fan 42 to the outlets 46 is formed between the refrigerating chamber heat exchanger 41 and the rear surface of the refrigerating chamber 14. Therefore, in case that the refrigerating chamber fan 42 is operated, the air in the refrigerating chamber 14 is drawn through the inlet and the intake path 45, rises, and passes through the refrigerating chamber heat exchanger 41. Then, the air, which is cooled by the heat-exchange action of the refrigerating chamber heat exchanger 41, is guided by the discharge path 47 and is then uniformly discharged into the refrigerating chamber 14 through the outlets 46.

The refrigerating chamber heat exchanger 41 and the freezing chamber heat exchanger 31 are connected in series, an inlet pipe of the refrigerating chamber heat exchanger 41 passes through a condenser (not shown) and is connected to an outlet of the compressor 16, and an outlet pipe of the freezing chamber heat exchanger 41 is connected to an inlet of the compressor 16. Thereby, a refrigerant compressed by the compressor 16 passes through the condenser to be condensed, and sequentially passes through the refrigerating chamber heat exchanger 41 and the freezing chamber heat exchanger 31.

Figure 3:
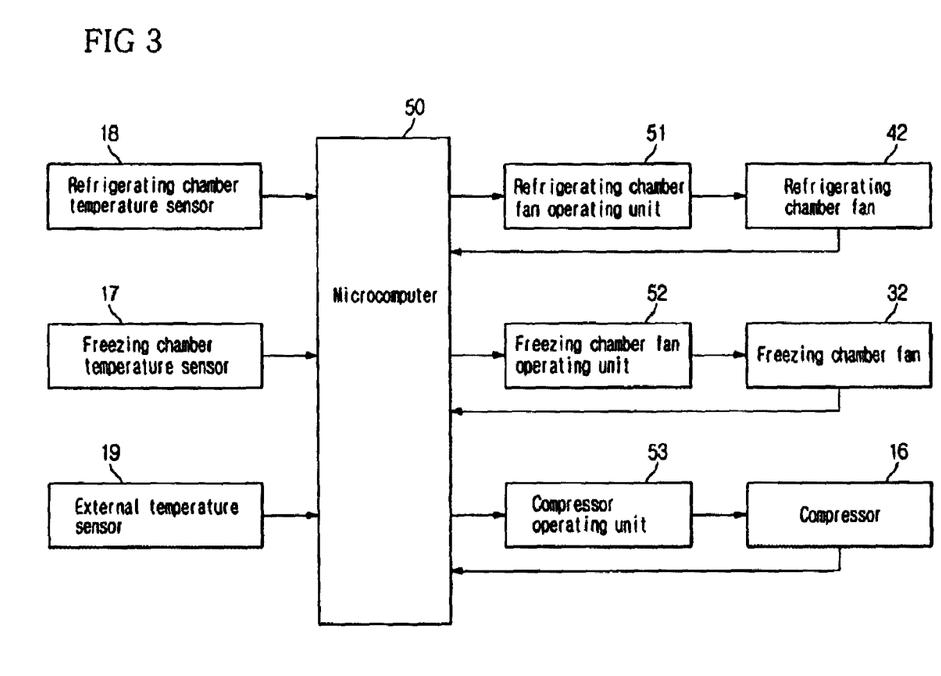
FIG. 3 is a block diagram illustrating constitution of the refrigerator shown in FIG. 2.

As shown in FIG. 3, the refrigerator in accordance with the embodiment of the present invention further comprises a refrigerating chamber fan operating unit 51 for operating the refrigerating chamber fan 42, a freezing chamber fan operating unit 52 for operating the freezing chamber fan 32, a compressor operating unit 53 for operating the compressor 16, and a microcomputer 50 for controlling the overall operation of the refrigerator.

Figure 4:
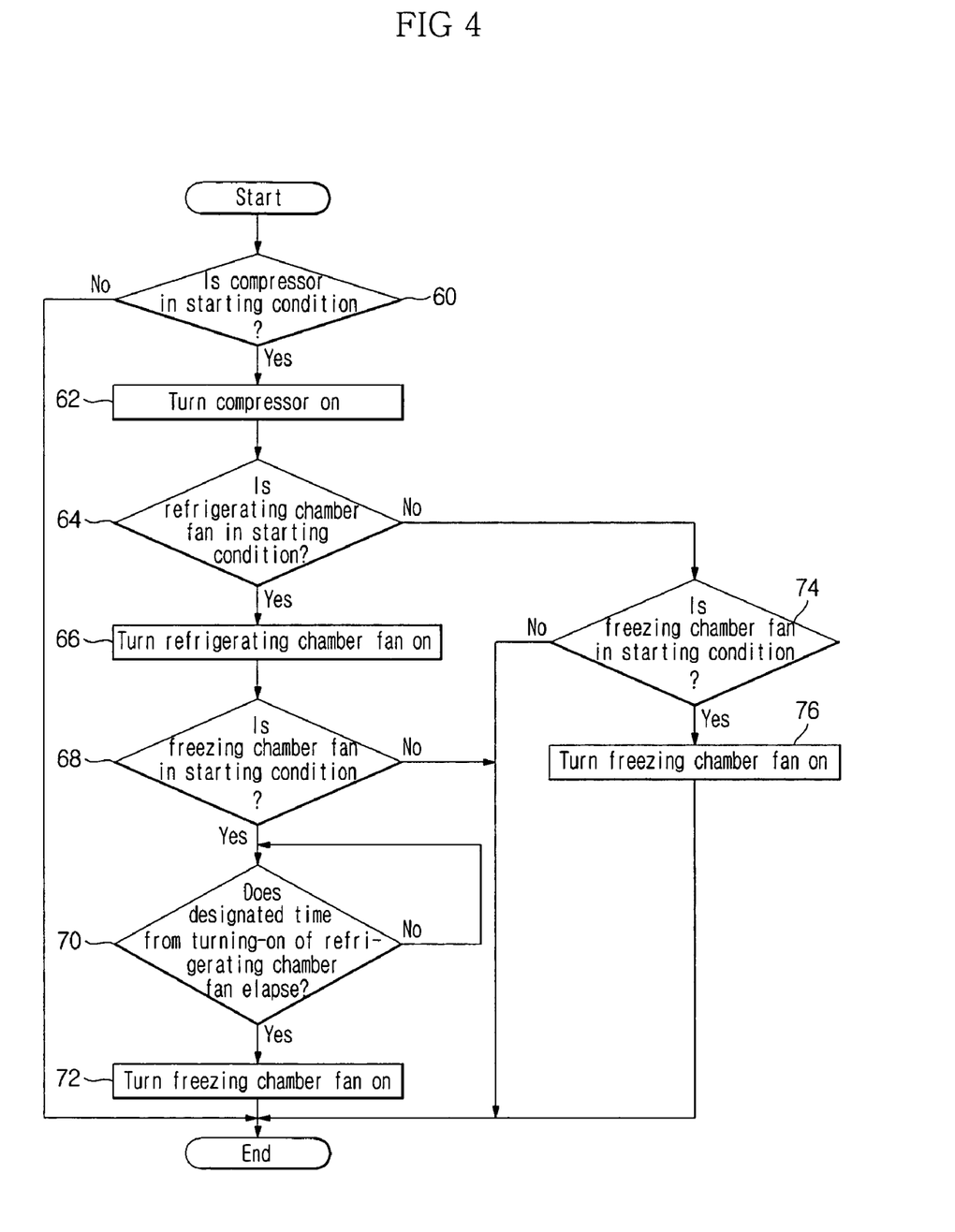
FIG. 4 is a flow chart illustrating operation of the refrigerator shown in FIG. 3.

Hereinafter, with reference to FIG. 4, operation of the refrigerator shown in FIG. 3 will be described in detail. In the refrigerator, in which the freezing chamber 12 and the refrigerating chamber 14 are independently cooled by the separately installed freezing and refrigerating chamber heat exchangers 31 and 41, the maintaining of the temperature of the freezing chamber 12 for a designated time and then the decreasing of the temperature, even when the freezing chamber fan 32 and the refrigerating chamber fan 42 are simultaneously operated, is mainly generated in case that the compressor 16 is started. Thus, the microcomputer 50 determines whether or not the compressor 16 is in a starting condition (S60).

The starting condition of the compressor 16 is set in relation to the temperatures of the freezing and refrigerating chambers 12 and 14. That is, the starting condition of the compressor 16 refers to a case that the compressor 16 is not operated even when the temperature of the refrigerating chamber 14 measured by the refrigerating chamber temperature sensor 18 is higher than a first reference temperature or the temperature of the freezing chamber 12 measured by the freezing chamber temperature sensor 17 is higher than a second reference temperature.

The first reference temperature is a target control temperature of the refrigerating chamber 14, and is set by the temperature of the refrigerating chamber 14 selected by a user using a temperature regulator (not shown) of the refrigerator. For example, in case that a refrigerating capacity of the refrigerator is regulated by three stages, such as high, medium and low levels, the target control temperature of the refrigerating chamber 14, when the high level of the refrigerating capacity is selected by the user, is "1", the target control temperature of the refrigerating chamber 14, when the medium level of the refrigerating capacity is selected by the user, is "3", and the target control temperature of the refrigerating chamber 14, when the low level of the refrigerating capacity is selected by the user, is "5". In this case, when the user selects the high level of the refrigerating capacity through the temperature regulator of the refrigerator, the first reference temperature is set to "1".

The second reference temperature is a target control temperature of the freezing chamber 12, and is set in the same manner as that first reference temperature.

The microcomputer 50 receives the temperature values of the freezing and refrigerating chambers 12 and 14 from the freezing and refrigerating chamber temperature sensors 17 and 18, and then analyzes a signal fed back from the compressor 16, thereby determining whether the analyzed result satisfies the starting condition of the compressor 16.

In case that it is determined that the analyzed result does not satisfy the starting condition of the compressor 16, the microcomputer 50 terminates the cycle, and in case that it is determined that the analyzed result satisfies the starting condition of the compressor 16, the microcomputer 50 transmits a control signal to the compressor operating unit 53 so as to turn the compressor on (S62). Thereafter, the microcomputer 50 determines whether or not the refrigerating chamber fan 42 is in a starting condition (S64).

In the same manner as the starting condition of the compressor 16, the starting condition of the refrigerating chamber fan 42 is set in relation to the temperatures of the freezing and refrigerating chambers 12 and 14. That is, the microcomputer 50 determines whether or not the refrigerating chamber fan 42 is in the starting condition in consideration of the temperature of the refrigerating chamber 14 measured by the refrigerating chamber temperature sensor 18, the first reference temperature and a signal fed back from the refrigerating chamber fan 42. In case that the refrigerating chamber fan 42 is not operated under the condition that the temperature of the refrigerating chamber 14 is higher than the first reference temperature, it is determined that the refrigerating chamber fan 42 is in the starting condition.

In case that it is determined that the refrigerating chamber fan 42 is in the starting condition, the microcomputer 50 controls the refrigerating chamber fan operating unit 51 to turn the refrigerating chamber fan 42 on (S66), and then determines whether or not the freezing chamber fan 32 is in a starting condition (S68). The starting condition of the freezing chamber fan 32 is set in relation to the temperatures of the freezing and refrigerating chambers 12 and 14. That is, the microcomputer 50 determines whether or not the freezing chamber fan 32 is in the starting condition in consideration of the temperature of the freezing chamber 12 measured by the freezing chamber temperature sensor 17, the second reference temperature and a signal fed back from the freezing chamber fan 32. In case that the freezing chamber fan 32 is not operated under the condition that the temperature of the freezing chamber 12 is higher than the second reference temperature, it is determined that the freezing chamber fan 32 is in the starting condition.

In case that it is determined that the freezing chamber fan 32 is not in the starting condition, the microcomputer 50 terminates the cycle, and in case that it is determined that the freezing chamber fan 32 is in the starting condition, the microcomputer 50 determines whether or not a designated time from the turning-on of the refrigerating chamber fan 42 elapses (S70). In case that it is determined that the designated time from the turning-on of the refrigerating chamber fan 42 does not elapse, the microcomputer 50 returns the cycle to step S70, and in case that it is determined that the designated time from the turning-on of the refrigerating chamber fan 42 has elapsed, the microcomputer 50 transmits a control signal to the freezing chamber fan operating unit 52 so as to turn the freezing chamber fan 32 on (S72).

In the preferred embodiment of the present invention, when the freezing chamber fan 32 is in the starting condition, it is determined whether or not the designated time from the turning-on of the refrigerating chamber fan 42 elapses.

However, when the freezing chamber fan 32 is in the starting condition, it may be determined whether or not the external temperature sensed by the external temperature sensor 19 is higher than a third reference temperature. Then, in case that it is determined that the external temperature is higher than the third reference temperature, step S70 is performed, and in case that the external temperature is lower than the third reference temperature, step S72 is performed.

The third reference temperature denotes the lower limit of the external temperature, which represents effects of the present invention. The higher the external temperature is, the higher the effects of the present invention are. Thus, the immediate turning-on of the freezing chamber fan 32 is determined by whether or not the external temperature is higher than the third reference temperature. The higher the external temperature is, the more increased the load of the compressor 16, when the compressor 16 is started. That is, in case that the external temperature is higher, the compressor 16 has an increased load for reducing the temperatures of the freezing and refrigerating chambers 12 and 14 to predetermined temperatures. Further, the capacity of the compressor 16 is limited. Even when the compressor 16 is started together with the startings of the refrigerating chamber fan 42 and the freezing chamber fan 32, since the refrigerant reaches the freezing chamber heat exchanger 31 after the refrigerant absorbs heat by the heat-exchanging action so as to lower the temperature of the refrigerating chamber 14, the lowering of the temperature of the freezing chamber 12 is achieved after a considerably long time elapses.

Accordingly, in case that the external temperature is higher than the third reference temperature, the freezing chamber fan 32 is turned on after a designated time elapses, thereby reducing a power consumption rate of the refrigerator. In case that the external temperature is lower than the third reference temperature, the freezing chamber fan 32 can be immediately turned on.

On the other hand, in case that the refrigerating chamber fan 42 is not in the starting condition in step S64, the microcomputer 50 determines whether or not the freezing chamber fan 32 is in the starting condition (S74). In case that it is determined that the freezing chamber fan 32 is in the starting condition, the microcomputer 50 turns the freezing chamber fan 32 on (S76), and in case that it is determined that the freezing chamber fan 32 is not in the starting condition, the microcomputer 50 terminates the cycle.

Figure 5:
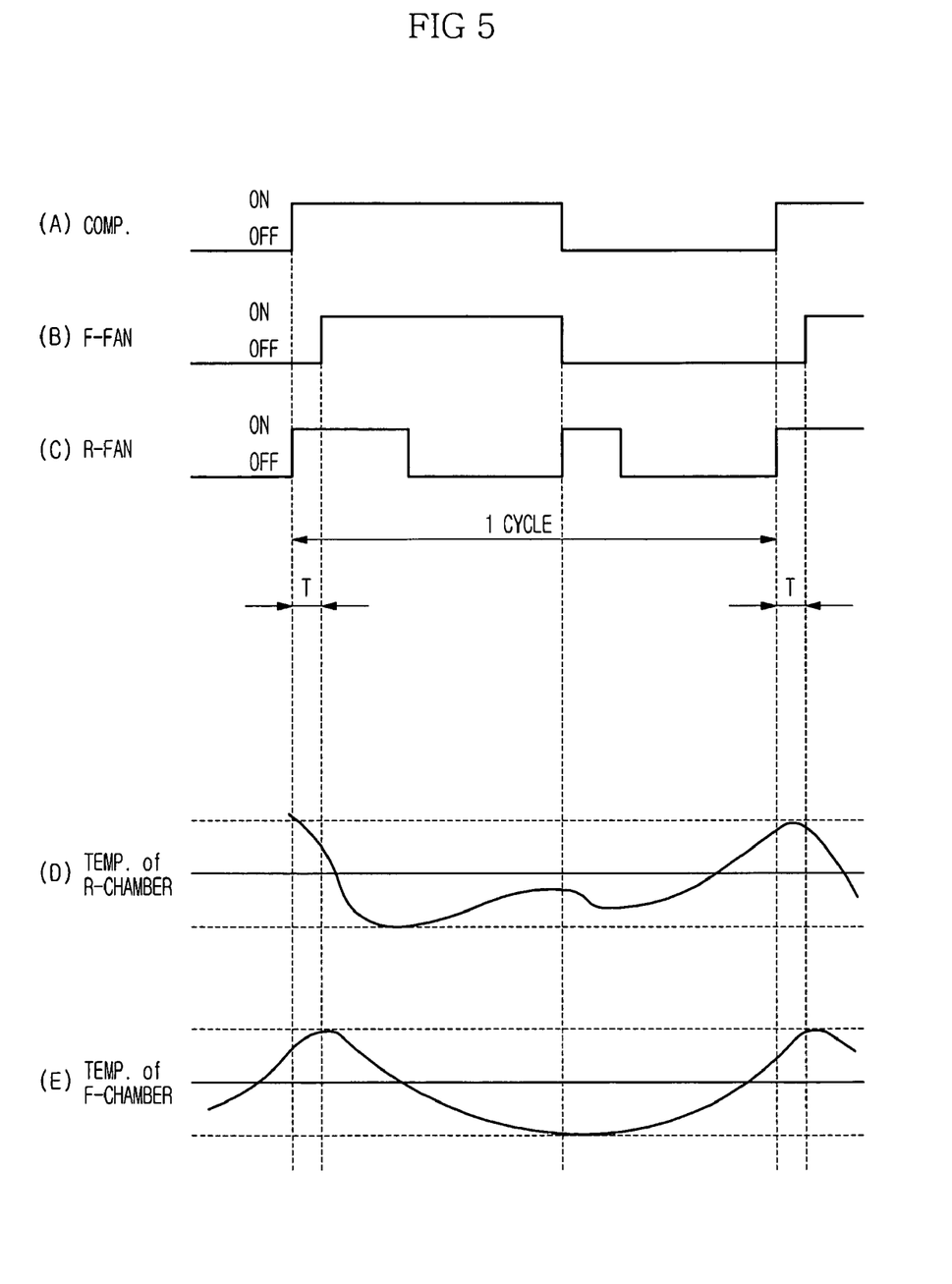
FIGS. 5A to 5E are graphs illustrating variations in temperature of refrigerating and freezing chambers of the refrigerator shown in FIG. 3 in relation to operations of refrigerating and freezing chamber fans.

With reference to FIGS. 5A to 5E, FIG. 5A is a graph illustrating the on-off operation of the compressor 16, FIG. 5B is a graph illustrating the on-off operation of the freezing chamber fan 32, FIG. 5C is a graph illustrating the on-off operation of the refrigerating chamber fan 42, FIG. 5D is a graph illustrating variation in the temperature of the refrigerating chamber 14 in relation to the operations of the compressor 16 and the refrigerating chamber fan 42, and FIG. 5E is a graph illustrating variation in the temperature of the freezing chamber 12 in relation to the operations of the compressor 16 and the freezing chamber fan 32.

As shown in FIGS. 5A to 5E, although the compressor 16 and the refrigerating chamber fan 42 are turned on and then the freezing chamber fan 32 is turned on after a designated time (T) from the turning-on of the compressor 16 and the refrigerating chamber fan 42, the variation in the temperature of the freezing chamber 12 of the refrigerator of the present invention is the same as the variation in the temperature of the freezing chamber of the conventional refrigerator. Thus, the structure of the refrigerator of the present invention does not influence the variation in the temperature of the freezing chamber 12, and reduces a power consumption rate of the refrigerator.

In the preferred embodiment of the present invention, the microcomputer 50 sequentially determines whether or not the compressor 16 is in the starting condition, whether or not the refrigerating chamber fan 42 is in the starting condition, and whether or not the freezing chamber fan 32 is in the starting condition, and turns the compressor 16, the refrigerating chamber fan 42 and the freezing chamber fan 32 on based on the determined results. However, the microcomputer 50 may simultaneously determine whether or not the compressor 16 is in the starting condition, whether or not the refrigerating chamber fan 42 is in the starting condition, and whether or not the freezing chamber fan 32 is in the starting condition, and then simultaneously start the compressor 16, the refrigerating chamber fan 42 and the freezing chamber fan 32. For example, the microcomputer 50 determines whether or not the compressor 16 and the refrigerating chamber fan 42 are respectively in the starting conditions, and sequentially or simultaneously turns the compressor 16 and the refrigerating chamber fan 42 on in case that it is determined that the compressor 16 and the refrigerating chamber fan 42 are in the starting conditions. Then, the microcomputer 50 determines whether or not the freezing chamber fan 32 is in the starting condition, and turns the freezing chamber fan 32 on after a designated standby time in case that it is determined that the freezing chamber fan 32 is in the starting condition.

Alternatively, the microcomputer 50 simultaneously determines whether or not the compressor 16 is in the starting condition, whether or not the refrigerating chamber fan 42 is in the starting condition, and whether or not the freezing chamber fan 32 is in the starting condition. Then, in case that the compressor 16, the refrigerating chamber fan 42 and the freezing chamber fan 32 are in the starting conditions, the microcomputer 50 sequentially or simultaneously turns the compressor 16 and the refrigerating chamber fan 42 on, and then starts the freezing chamber fan 32 after a designated time from the turning-on of the compressor 16 and the refrigerating chamber fan 42.

As apparent from the above description, the present invention provides a refrigerator, in which air blast fans in storage chambers are controlled so as to reduce a power consumption rate, and a control method of the refrigerator.

Although the preferred embodiment of the invention has been disclosed for illustrative purposes, those skilled in the art will appreciate that various modifications, additions and substitutions are possible, without departing from the scope and spirit of the invention as disclosed in the accompanying claims.

What is claimed is:

1. A control method of a refrigerator comprising the steps of:
   (a) determining whether or not a plurality of air blast devices, respectively connected to a plurality of storage chambers, and a compressor are respectively in starting conditions;
   (b) in case that it is determined that at least two air blast devices and the compressor are in the starting conditions, turning a part of the at least two air blast devices in the starting condition and the compressor on; and
   (c) turning all of the air blast devices in the starting condition on after a designated time from the turning-on of the part of the at least two air blast device elapses,
   wherein a temperature of external air around the refrigerator is measured in case that at least one of the air blast devices is in the starting condition and it is determined whether or not the measured temperature is higher than a third reference temperature, then at least one air blast device is turned on after the designated time elapses in case that it is determined that the measured temperature is higher than the third reference temperature, or the at least one air blast device is immediately turned on in case that it is determined that the measured temperature is lower than the third reference temperature.

2. The control method according to claim 1, wherein the compressor is in the starting condition, in case that at least one of the storage chambers has a temperature higher than a corresponding reference temperature.

3. The control method according to claim 1, wherein the air blast devices are in the starting condition, in case that the storage chambers connected to the air blast devices have temperatures higher than corresponding reference temperatures.

4. The control method according to claim 1, wherein the compressor and the part of the at least two air blast devices in the starting condition are sequentially turned on.

5. The control method according to claim 1, wherein the part of the at least two air blast devices in the starting condition and the compressor are simultaneously turned on.

6. A control method of a refrigerator comprising the steps of:
   (a) determining whether or not a compressor and a refrigerating chamber air blast device are respectively in starting conditions;
   (b) in case that it is determined that the compressor and the refrigerating chamber air blast device are respectively in the starting conditions, turning the compressor and the refrigerating chamber air blast device on;
   (c) determining whether or not a freezing chamber air blast device is in a starting condition; and
   (d) in case that it is determined that the freezing chamber air blast device is in the starting condition, turning the freezing chamber air blast device on after a designated time from the turning-on of the refrigerating chamber air blast device elapses,
   wherein a temperature of external air around the refrigerator is measured in case that the freezing chamber air blast device is in the starting condition and it is determined whether or not the measured temperature is higher than a third reference temperature, then the freezing chamber air blast device is turned on after the designated time elapses in case that it is determined that the measured temperature is higher than the third reference temperature, or the freezing chamber air blast device is immediately turned on in case that it is determined that the measured temperature is lower than the third reference temperature.

7. The control method according to claim 6, wherein the compressor is in the starting condition, in case that the refrigerating chamber has a temperature higher than a first reference temperature or the freezing chamber has a temperature higher than a second reference temperature.

8. The control method according to claim 6, wherein the refrigerating chamber air blast device is in the starting condition, in case that the refrigerating chamber has a temperature higher than a first reference temperature.

9. The control method according to claim 6, wherein the freezing chamber air blast device is in the starting condition, in case that the freezing chamber has a temperature higher than a second reference temperature.

10. The control method according to claim 6, wherein the compressor and the refrigerating chamber air blast device are sequentially turned on.

11. The control method according to claim 6, wherein the refrigerating chamber air blast device and the compressor are simultaneously turned on.

12. A refrigerator comprising:
   a plurality of storage chambers prepared in a main body;
   a plurality of heat exchangers connected to the corresponding storage chambers for heat-exchanging air in the storage chambers;
   a plurality of air blast devices for circulating the air in the storage chambers;
   a compressor for compressing a refrigerant to supply the refrigerant to the heat exchangers; and
   a controller for, in case that it is determined that at least two air blast devices and the compressor are in the starting conditions, turning a part of the at least two air blast devices in the starting condition and the compressor on, and for turning all of the air blast devices in the starting condition on after a designated time from the turning-on of the air blast device elapses,
   wherein a temperature of external air around the refrigerator is measured in case that at least one of the air blast devices is in the starting condition and it is determined whether or not the measured temperature is higher than a third reference temperature, then at least one air blast device is turned on after the designated time elapses in case that it is determined that the measured temperature is higher than the third reference temperature, or the at least one air blast device is immediately turned on in case that it is determined that the measured temperature is lower than the third reference temperature.

13. A refrigerator comprising:
   freezing and refrigerating chambers prepared in a main body;
   freezing and refrigerating chamber heat exchangers respectively connected to the freezing and refrigerating chambers for heat-exchanging air in the freezing and refrigerating chambers;
   freezing and refrigerating air blast devices for circulating the air in the freezing and refrigerating chambers;
   a compressor for compressing a refrigerant to supply the refrigerant to the freezing and refrigerating air blast devices; and
   a controller for turning the compressor and the refrigerating chamber air blast device on, in case that it is determined that the compressor is in the starting condition and the freezing and refrigerating air blast devices are in starting conditions, and for turning the freezing chamber air blast device on after a designated time from the turning-on of the compressor and the refrigerating chamber air blast device elapses, wherein a temperature of external air around the refrigerator is measured in case that the freezing chamber air blast device is in the starting condition and it is determined whether or not the measured temperature is higher than a third reference temperature, then the freezing chamber air blast device is turned on after the designated time elapses in case that it is determined that the measured temperature is higher than the third reference temperature, or the freezing chamber air blast device is immediately turned on in case that it is determined that the measured temperature is lower than the third reference temperature.

* * * * *